(12) United States Patent
Reid (10) Patent No.: US 8,651,053 B2
(45) Date of Patent: Feb. 18, 2014

(54) GRAVITY FED AUTOMATIC ROTARY VEIN DISPENSER

(76) Inventor: Wayland Reid, Arlington, TX (US)

( * ) Notice: Subject to any disclaimer, the term of this patent is extended or adjusted under 35 U.S.C. 154(b) by 117 days.

(21) Appl. No.: 13/452,565

(22) Filed: Apr. 20, 2012

(65) Prior Publication Data

US 2013/0192527 A1 Aug. 1, 2013

Related U.S. Application Data (60) Provisional application No. 61/593,260, filed on Jan. 31, 2012.

(51) Int. Cl.
*A01K 1/10* (2006.01)
*A01K 61/02* (2006.01)

(52) U.S. Cl.
USPC .................................. 119/51.12; 119/52.1

(58) Field of Classification Search
USPC ............ 119/51.11, 51.01, 51.12, 51.13, 52.1, 119/53, 57.1, 57.92
See application file for complete search history.

(56) References Cited

U.S. PATENT DOCUMENTS

| | | | | |
|---|---|---|---|---|
| 4,279,221 A * | 7/1981 | Arvizu | ..................... | 119/51.11 |
| 4,889,078 A * | 12/1989 | Smiley | ......................... | 119/53.5 |
| 5,044,837 A * | 9/1991 | Schmidt | ......................... | 406/85 |
| 5,555,842 A * | 9/1996 | Chocola et al. | ............ | 119/51.11 |
| 6,367,417 B1 * | 4/2002 | Gal et al. | ..................... | 119/51.5 |
| 6,401,657 B1 * | 6/2002 | Krishnamurthy | .......... | 119/51.11 |
| 6,615,764 B2 * | 9/2003 | Voogd et al. | ............... | 119/51.02 |
| 6,758,163 B1 * | 7/2004 | Sternitzky | ................... | 119/51.11 |
| 6,779,486 B2 * | 8/2004 | Vaags | ......................... | 119/51.11 |
| 6,789,503 B1 * | 9/2004 | Gao | .............................. | 119/51.11 |
| 6,988,465 B2 * | 1/2006 | Park | .......................... | 119/51.12 |
| 7,757,903 B2 * | 7/2010 | Schwartz et al. | ............ | 222/368 |
| 2003/0070622 A1 * | 4/2003 | Vaags | ........................ | 119/51.11 |

* cited by examiner

*Primary Examiner* — Monica Williams
(74) *Attorney, Agent, or Firm* — Hulsey P.C.; William N. Hulsey, III; Jacob S. Mattis (57) ABSTRACT

In accordance with the disclosed subject matter, an automatic feeder comprising a feed bin for storing bulk material, a trough for dispensing the feed to livestock, and a vein assembly positioned horizontally between the feed bin and the trough for transferring the bulk feed from the feed bin to the trough is provided. The vein assembly comprises a vein tube that houses a rotatable vein shaft and flexible wipers affixed as spokes to the shaft that form vein compartments for the feed. A motor assembly with a programmable timer rotates the vein shaft within the vein tube thereby transferring feed from the feed bin, to the vein compartments, and then to the trough.

12 Claims, 12 Drawing Sheets

GRAVITY FED AUTOMATIC ROTARY VEIN DISPENSER

CROSS-REFERENCE TO RELATED APPLICATIONS

This application claims priority to U.S. Provisional Patent Application Ser. No. 61/593,260 filed Jan. 31, 2012, which is hereby incorporated by reference in its entirety.

FIELD

The present disclosure relates in general to the fields of automated bulk material dispensers. More particularly the apparatus relates to automatically dispensing feed products to animals, specifically livestock.

BACKGROUND

Among current automated feeder mechanisms used for feeding livestock, such as cattle or horses, perhaps one of the most common types is what is termed a "bunk feeder" which utilizes a gravity-fed trough combined with a bulk storage compartment above. As feed in the trough is eaten, feed from the storage compartment spills downward through a hole in the feed compartment above to replace the eaten feed. This is a very common and useful tool in raising livestock. While the existing designs of livestock feeders represent improvements in reduction of the amount of dirt and sand the animal is likely to ingest when compared to feeding on the ground, they do have their limitations.

For instance, a bunk feeder often does not have means for protecting feed from the elements, such as rain, snow, etc . . . , as feed is placed in the trough at all times. As a result, the feed in the trough is exposed to the weather and can absorb moisture from damp air or rain and begin to mold or become unpalatable. Also, the feed may be subject to waste as other wildlife may continuously eat the exposed feed, such as feral hogs which may feast nightly.

Yet an additional problem with many known conventional livestock feeders is a lack of means for regulating the amount of feed and time of feeding. Many feeders are often self-feeding, more commonly referred to as "free-choice" as the animals may eat all they want—as the animal eats the feed in the trough more feed continually falls from the bulk storage above to replace the consumed feed. As a result, the animal has immediate access to the entire quantity of food placed in the feeder storage compartment. "Free-choice" feeders permit livestock to feed in an unrestricted manner which results in a considerable wastage of food—an economic loss to the owner.

As a mitigation measure to combat unregulated feeding from "free-choice" feeders, salt is mixed in with the bulk feed as a management procedure to limit feed intake of livestock as salt limits the amount of feed livestock will eat in one feeding. Without the addition of salt, livestock will continue to gorge themselves on available feed. However, salt is not a precise regulator of intake since certain animals may tolerate more salt than others and thus keep feeding. Also, as the animals must excrete the salt absorbed by the intestines into the blood stream through urine, abundant water is essential to any operation that manages feed intake with salt. The Texas Agricultural Extension Service advises that daily voluntary intake of salt for cattle is approximately 0.1 lbs. of salt for every 100 pounds of body weight. As a result, a 1000 lbs. cow eats a pound of salt a day—a certain health risk. Thus, livestock may be healthier if feed is managed without the risk of salt toxicity.

Further, feeding livestock twice a day is beneficial for growth performance and health. Preferably, livestock should be fed once in the morning and once in the afternoon/evening. It is also preferable to feed at the time each day that corresponds with the lowest environmental heat load in the summer and the coldest conditions of winter. Often, this may be difficult for the hand feeding animal owner to plan for due to work schedules, vacations away from home, or inclement weather. And when the owner is not available to personally portion out the feed at the predetermined intervals, another person must take over the chore. This method of hand feeding multiple times a day results in a large labor expense. In addition to problems that occur when those normally involved and responsible for feeding activities are not available for extended periods of time, many people tend to animals in remote locations away from their residences making the amount of work and time required for twice daily feedings expensive and inconvenient.

It is apparent that a need exists for a livestock feeding apparatus that avoids the problems relating to feeding from the ground, feeding an endless supply of wasteful free-choice feed, and is efficient and robust in operation and labor costs for multiple daily feedings. Desirably, such an apparatus would be capable of automatically delivering bulk feed, such as granulated, pelletized or cube feed, at predetermined times in a reliable manner.

Understandably, automatic feed dispensing mechanisms have been developed to dispense material from a protected storage area to an accessible location in a controlled manner for various applications; however, currently available automatic feeding apparatus have several disadvantages. A significant disadvantage of conventional feeder mechanisms is overly complex and error-prone design. Further, many existing devices, such as broadcast deer-feeders, are not capable of or robust enough to handle automatically dispensing bulk feed to large-breed livestock. Other types of feeders have been developed wherein access to the feed is controlled by a timer-controlled gate or door; however, these devices are often unreliable, are not large enough for livestock such as cattle or horses, or may injure the livestock during operation when the gate or door opens/closes.

Several devices have been built to provide pre-measured amounts of food to animals automatically on a timed schedule. One such type of device, such as that disclosed in U.S. Pat. No. 3,658,036 by Caracappa, has multiple feed compartments arranged radially about a vertical axis with each compartment having its own trap door on hinges. This type of device may also have a holding finger for each compartment to hold the trap door closed until a rotating disc is aligned in order to release the finger and permit the door to drop and release the food from that compartment. Often, this type of device has been designed to feed a household pet or other small animal and is neither large nor rugged enough for use in the feeding of large ranch or farm animals. The design does not scale up to a size necessary for adequately feeding livestock because the circular canister for storing and dispensing the feed and the circular feeding dish beneath it would have to be built too large, and the disc that keeps the trap doors closed would have to be built too sturdy, to function correctly or be economical. In addition, the hinged trap doors and holding fingers for all of the compartments comprise many moving parts, thus making the device overly complicated, expensive to manufacture, and subject to mechanical failure and excessive need of maintenance.

Another type of device for automatically feeding animals is disclosed in U.S. Pat. No. 4,279,221 by Arvizu. This device utilized a hopper to store granulated feed in bulk form and from which the feed is gravity fed through a rotating food dispenser which is sized to measure the desired amount of food. While this type device has fewer moving parts, it is often limited to areas where 110 volt AC electricity is available—and thus inappropriate for feeding livestock in a field or remote area. Further, the design limits use to feeding small amounts of feed—the design has two "j-shaped" members that rotate on a shaft allowing minimal adjustment in disbursement of materials. Other problems with this design include: the design may not be suitable for rural applications as wildlife could turn over the machine and disrupt the operation, and there is no cover over the feed bowl to keep out weather elements.

A third type of device for automatically feeding animals is disclosed in U.S. Pat. No. 4,981,106 by Nagatomo. This is a battery-powered device that can dispense measured quantities of grain or other finely divided dry feed material on a set schedule. However, this design is only useful for small domestic pets such as fish or birds as it would not scale up to a size needed to dispense adequate feed portions to farm animals because the carousel, which contains all the feed and must be rotated by the motor, would necessarily have to be too large and heavy structure.

Various other devices also exist for feeding of specific animals such as hogs or fish. However, common hog feeding devices require feed in a mushy, semi-liquid state, to operate properly and fish feeding devices are too small and fragile for livestock feeding and are often designed to be attached to an aquarium.

SUMMARY

Therefore, a need has arisen for a feeder that is designed to automatically dispense a measured amount of feed for consumption by livestock on a programmable schedule with a large enough storage capacity for several tons of bulk feed. The feeder should have a rugged and simple design for easy and inexpensive manufacture and daily outdoor use to endure wear from feeding large active animals. In accordance with the disclosed subject matter, an automatic feeder for dispensing bulk feed to livestock is provided which substantially eliminates or reduces disadvantages associated with previously developed bulk feeders.

According to one aspect of the disclosed subject matter, an automatic feeder for dispensing bulk feed to livestock is provided that reliably and automatically dispenses an adjustable amount of feed from a feed storage bin to a trough for consumption. Further, the feeder disclosed allows a user to control both the amount of feed and the time that feed is dispensed into the trough.

In accordance with the disclosed subject matter, an automatic feeder comprising a feed bin for storing bulk material, a trough for dispensing the feed to livestock, and a vein assembly positioned horizontally between the feed bin and the trough for transferring the bulk feed from the feed bin to the trough is provided. The vein assembly comprises a vein tube that houses a rotatable vein shaft and flexible wipers affixed as spokes to the shaft that form vein compartments for the feed. A motor assembly with a programmable timer rotates the vein shaft within the vein tube thereby transferring feed from the feed bin, to the vein compartments, and then to the trough.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims.

BRIEF DESCRIPTION OF THE DRAWINGS

The features, nature, and advantages of the disclosed subject matter may become more apparent from the detailed description set forth below when taken in conjunction with the drawings in which like reference numerals indicate like features and wherein.

DETAILED DESCRIPTION

The following description is not to be taken in a limiting sense, but is made for the purpose of describing the general principles of the present disclosure. The scope of the present disclosure should be determined with reference to the claims. Exemplary embodiments of the present disclosure are illustrated in the drawings, like numbers being used to refer to like and corresponding parts of the various drawings.

And although the present disclosure is described with reference to specific embodiments, such as an automated bulk feeder for livestock, one skilled in the art could apply the principles discussed herein to other materials, technical areas, and/or embodiments without undue experimentation. It is to be especially noted that although this application references dispensing bulk feed for feeding livestock, the disclosed subject matter may be equally applicable to dispensing other types of material, such as packaging material, that need to be automatically dispensed at set time intervals. And although the feeder disclosed herein is described as a feeder for livestock, it is equally applicable for feeding domestic or wild animals such as, for example, deer, moose, and birds. Further, the figures and corresponding descriptive text describe a dual trough feeder utilizing two veins and two corresponding troughs for livestock; however, one trough feeder utilizing one vein assembly or multiple vein assemblies, or a multi-sided trough (such as triangle or square shaped) utilizing one or multiple vein assemblies from a single or multiple feed storage compartments are well within the scope of this description.

The disclosed subject matter addresses some of the current hurdles in automatically and reliably providing feed to livestock at predetermined times. The designs of the disclosed subject matter generally include a feed bin with an optional lower funnel portion, a trough, a vein assembly, and a motor assembly. These components may be made of steel or a metal alloy of similar strength to withstand the elements and daily wear and tear of feeding livestock. The feeder may consist of any number of food storage compartments in various sizes that coordinate with fencing or separation means to form a feeder that services different stalls, pens, corrals or barns. Additionally, many animal owners feed grains, supplements, or pelletized food in addition to hay. Thus, the disclosed feeder accommodates all common forms of bulk feed while having unlimited flexibility in feeding programming. Further, health and medical supplements may be easily added to the bulk feed to be reliably portioned out over time as needed to alleviate health and nutritional issues. The disclosed feeder also keeps feed elevated off of the ground, avoiding contamination and possible health risks to the animal.

Figure 1:
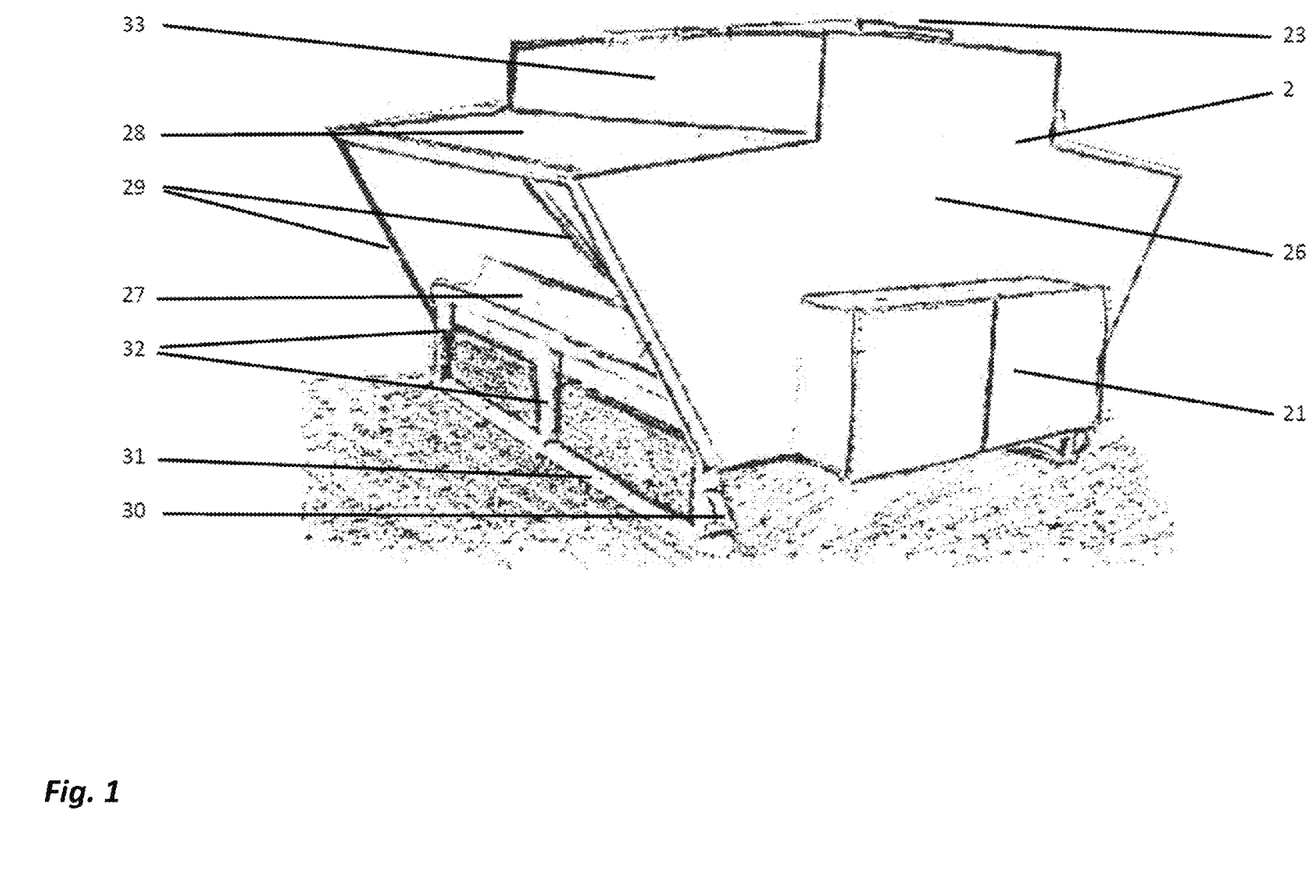
FIG. 1 is diagram depicting a side angle view of a dual trough feeder in accordance with the disclosed subject matter.
Figure 2:
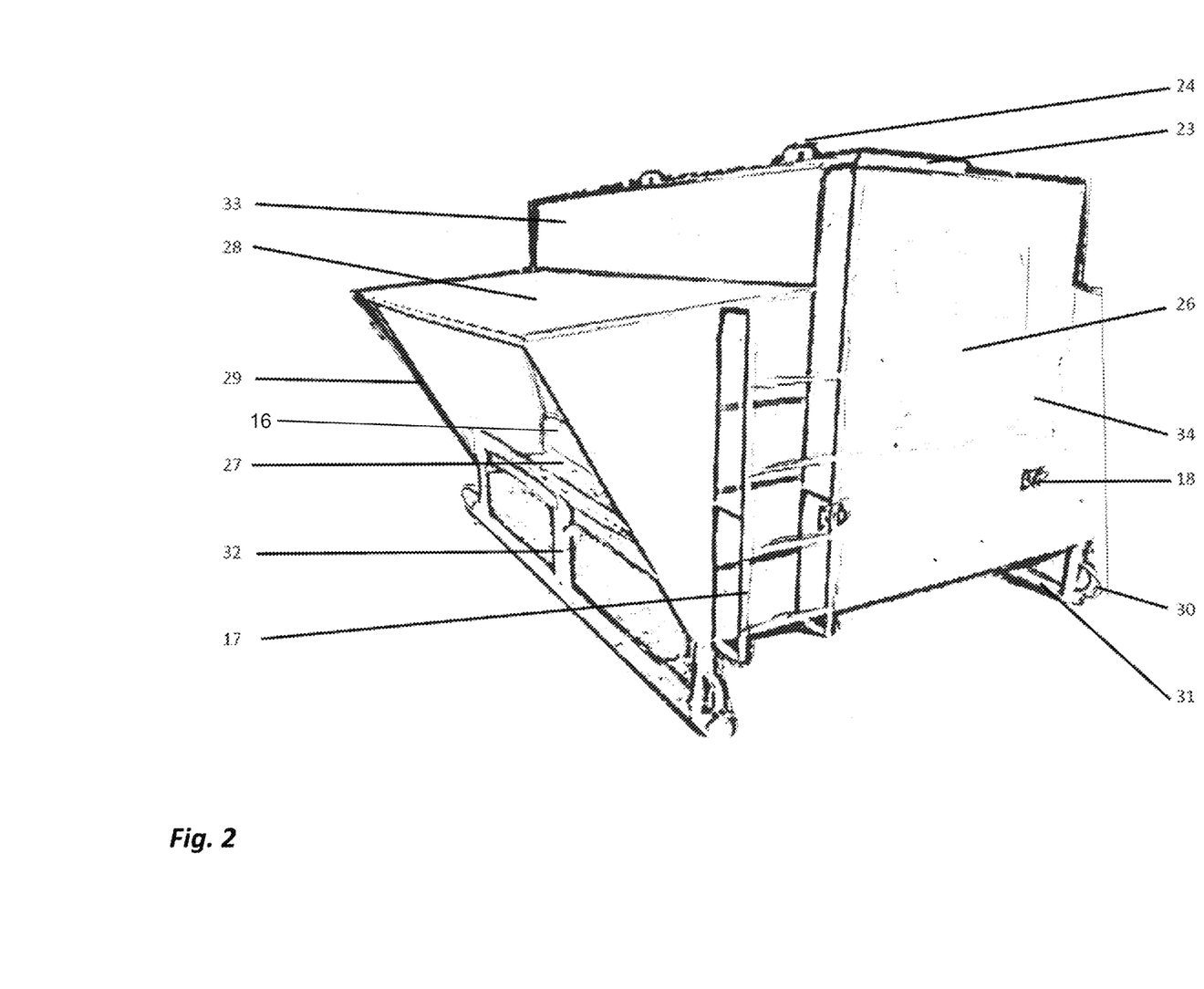
FIG. 2 is diagram depicting an alternative side angle view of a dual trough feeder in accordance with the disclosed subject matter.
Figure 3:
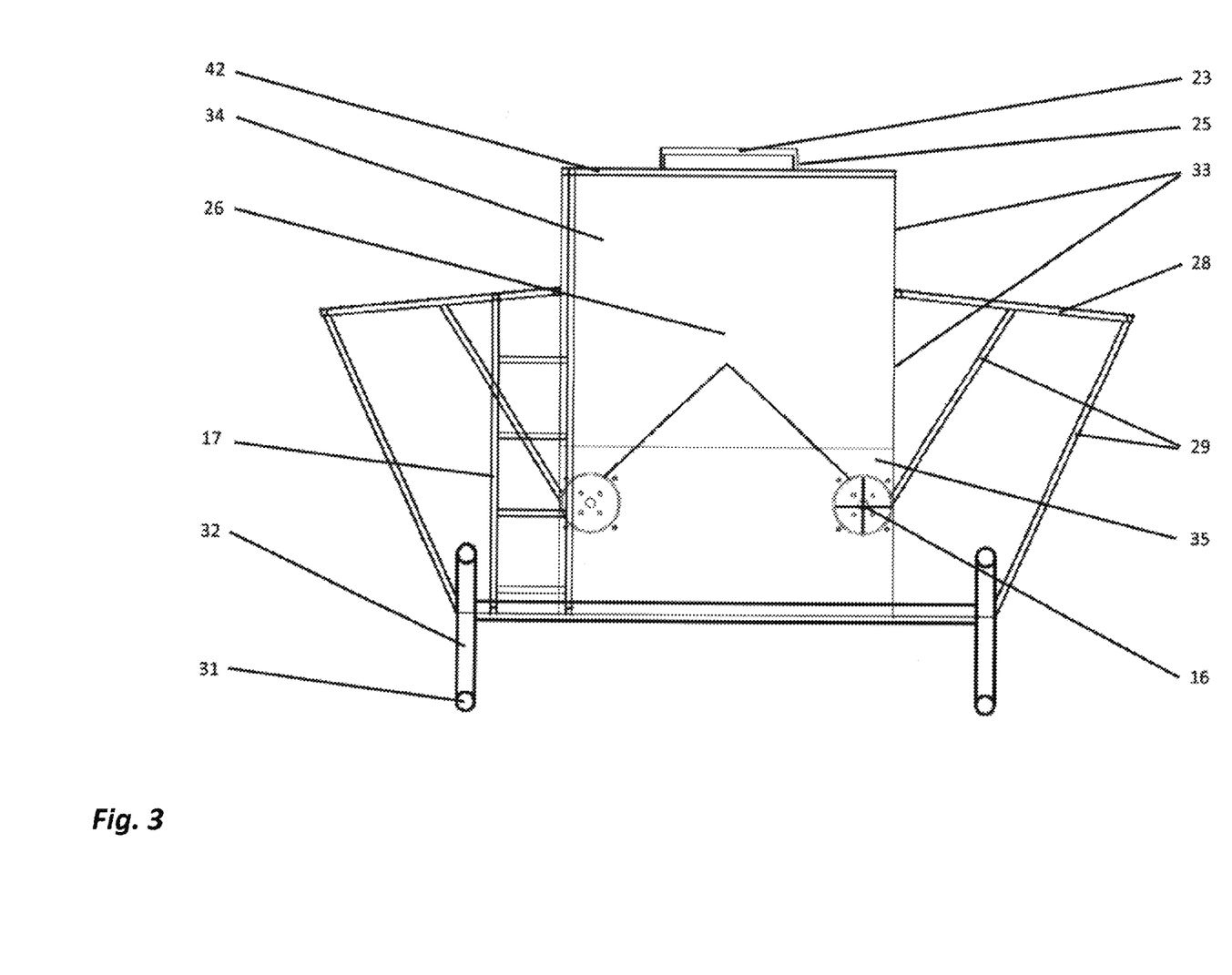
FIG. 3 is diagram depicting a cross-section perpendicular to the vein assembly of a dual trough feeder in accordance with the disclosed subject matter.
Figure 4:
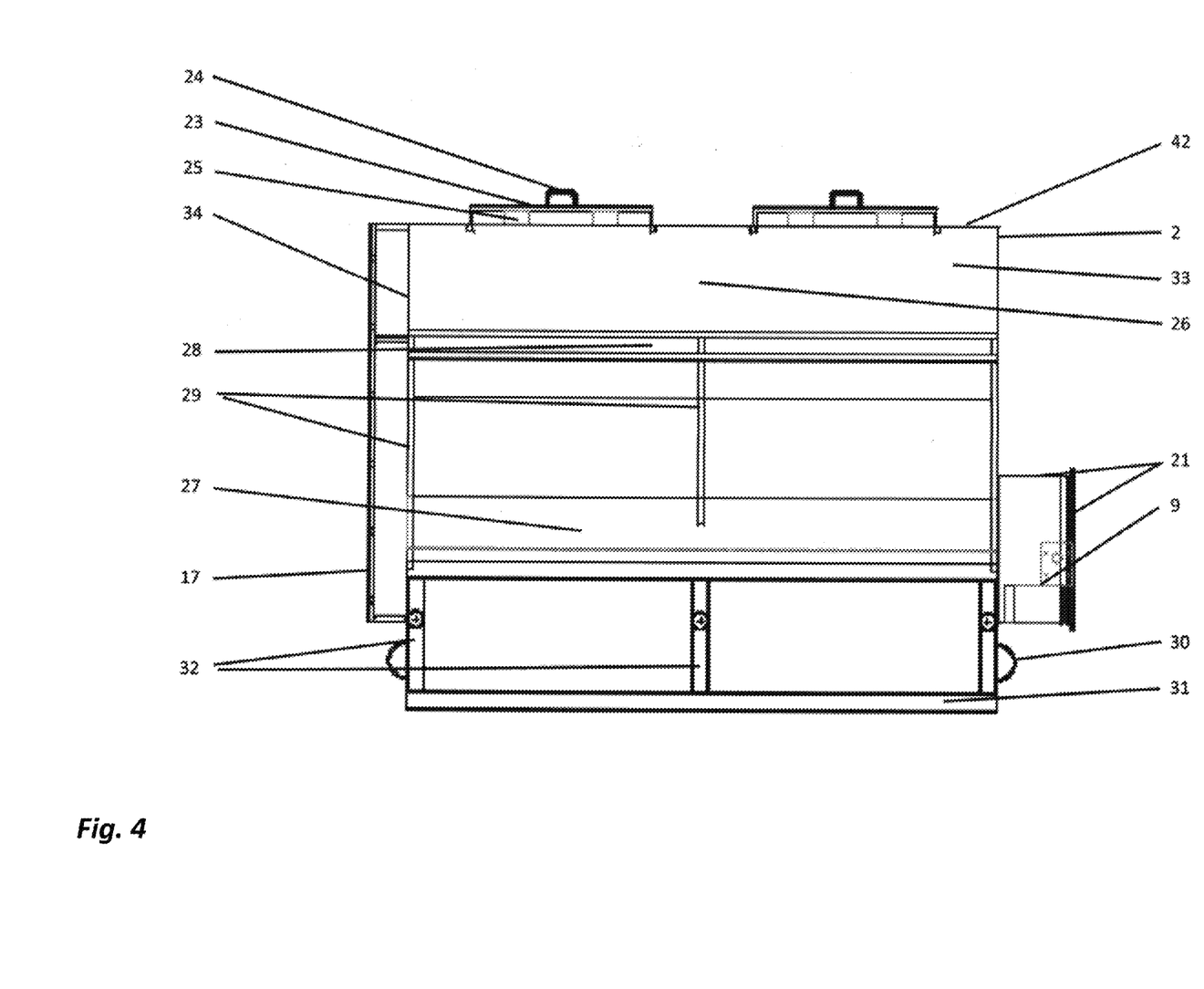
FIG. 4 is diagram depicting a cross-section parallel to the vein assembly of a dual trough feeder in accordance with the disclosed subject matter.
Figure 5:
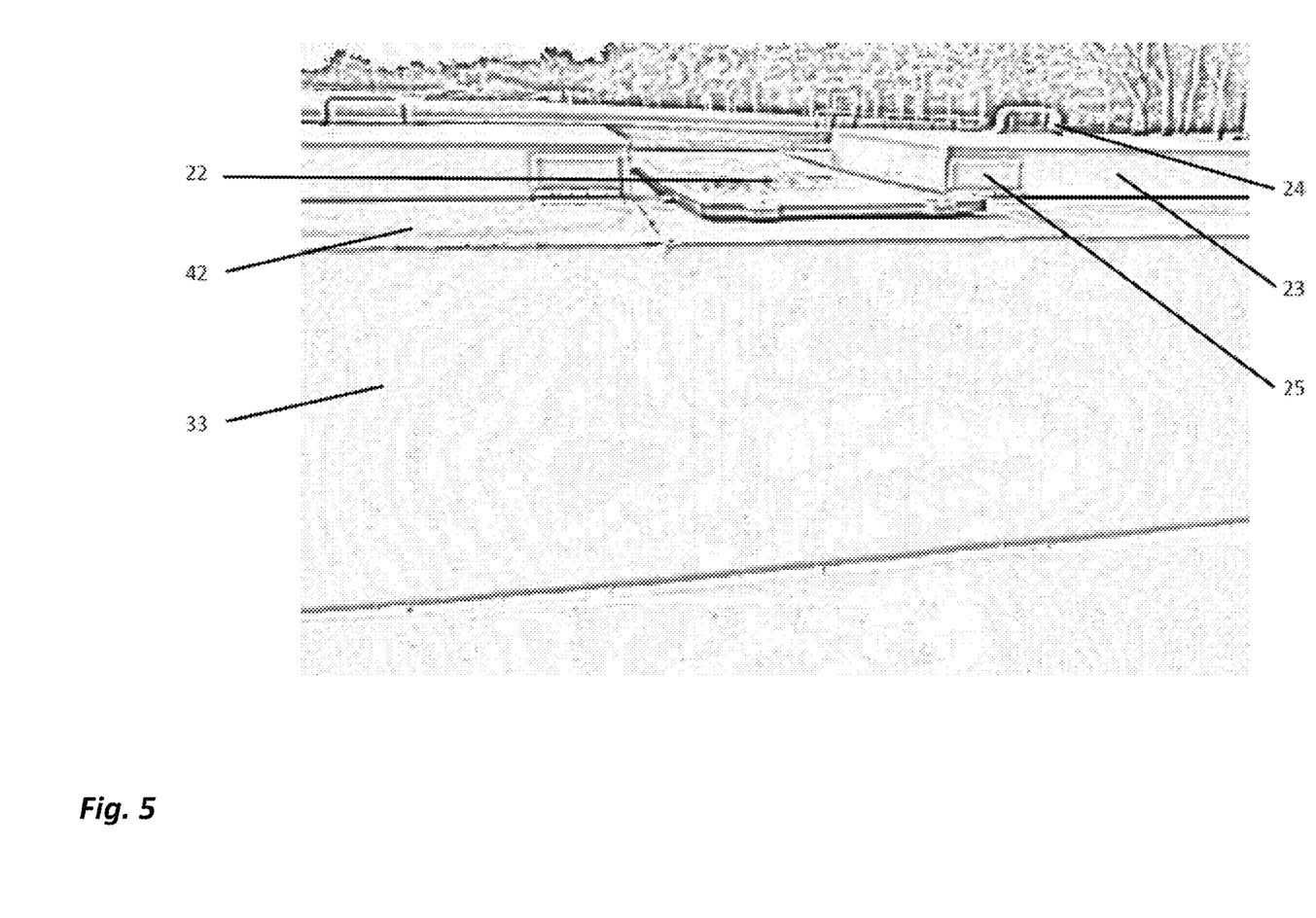
FIG. 5 is diagram depicting a top view of a dual trough feeder in accordance with the disclosed subject matter.

FIGS. 1-5 are diagrams depicting various views of a dual trough embodiment of the disclosed subject matter. An advantage of a dual trough feeder design is to distribute feed to both sides of the feeder into the corresponding troughs allowing more than one animal to eat at the same time without concern of a more dominant animal hoarding all the food. FIG. 1 is a side angle view of the motor side showing motor box 21, and FIG. 2 is a side angle view from the alternate side showing ladder 17 for accessing and loading the top of the storage bin. FIG. 3 is a diagram showing a cross-section perpendicular to the feeder vein assembly, and FIG. 4 is a diagram showing a cross-section parallel to the trough, trough 27, and vein assembly of the feeder. FIG. 5 is a top view highlighting solar panels 22 and lid doors 23 that provide access to the feed storage bin.

In some aspects, the disclosed feeder resembles a traditional bunk feeder of bulk feeds, with elevated feed trough 27 positioned above the ground on each side of the feeder and a storage compartment for bulk feed, referred to herein as feed bin 26, positioned above the feed troughs. However, between feed bin 26 and feed trough 27 (and proximate the optional funnel portion of the feed bin) a horizontal rotary vein mechanism, shown as rotary vein assembly 16, is positioned to manage the release of feed from the storage bin to the corresponding trough for consumption (detailed in FIGS. 6-8).

Each side of the dual-trough feeder shown in FIGS. 1-5 comprises a shallow trough-type receptacle for feed, shown as trough 27, attached to the side walls of the feed bin 26 that run the entire length of each side of the feeder. A rotary vein assembly is positioned above each trough to release the bulk materials from the bin and which settle in the trough for feeding. Above the troughs are roof-like canopies referred to as feed trough covers, shown as covers 28, that are supported by feed trough cover supports 29 and are affixed to the side walls of feed bin 26. Trough cover 28 protects the feed in the trough from weather elements that may damage the dispensed feed. Ladder 17 is positioned on the rear end panel 34 and provides access to feed bin lids 23.

A support means supports the bulk storage enclosure above the ground for easy retrieval and ingestion by the animal and to reduce the possibility of contamination and loss of feed by water, dirt or sand. The support means may be a set of fixed legs of adequate structural integrity, or for example, legs mounted to skids that may accommodate an uneven ground surface. As shown, skid 31, or alternatively a platform, is mounted to the bottom of the apparatus. A plurality of vertical skid supports 32 extend downwardly and may be secured to skid 31 by welding or other attachment means. Drag loops 30 act as an aid for moving/dragging the feeder.

The funnel shaped compartment storing the bulk feeding material, feed bin 26, is attached above the skids, and comprises of a plurality of walls (such as front end wall 2) forming a rectangular box-like structure to store and funnel bulk feed through the rotary vein and into the trough. The floor of the storage compartment is in the shape of two longitudinal, or horizontal, funnels, shown as funnel 35 in FIG. 3. Structurally, the floor looks like a shape of the letter "W" from either end (as can be seen in FIG. 3). The disclosed embodiment has two horizontal rotary vein tube mechanisms that run the entire length of the unit and are positioned parallel to the side walls 33 and directly under each funnel compartment of the floor.

As seen in FIG. 5, roof or top cover 42 extends over feed bin 26, and comprises locking lids or access doors 23, hinge means 25, and handles 24. Hinge means 25 allow access doors 23 to open position for the loading bulk materials into feed bin 26. Hinge means 25 also allow lids 23 to move into a closed position to protect the bulk material inside feed bin 26 from weather elements, other animals, and pests. Also positioned on the roof is optional solar panel 22 which may be used to charge battery 6.

A key component of the disclosed subject matter is the horizontal rotary vein assembly positioned between the feed storage compartment and the trough and shown as rotary vein assembly 16. The rotary vein assembly transfers bulk feed in vein compartments from the storage compartment to the trough for consumption. In one embodiment, the rotary vein assembly comprises a rotary vein tube and a rotatable "hub and spoke" shaped shaft. As the shaft rotates horizontally, bulk feed falls into the open vein compartments formed between the spoke fingers and is transferred to the trough below. The design of such is not that of a corkscrew-type typical auger, but rather uses flat horizontally oriented paddles or wipers attached to the shaft, and which run the length of the shaft, thus forming compartments for the bulk feed. The rotary vein tube houses the "hub and spoke" shaped shaft, and is essentially a long cylindrical pipe that runs the length of the feeder. The rotary vein tube has an opening running along the top of the tube for bulk feed to fall into the vein compartments from the storage bin, and an opening running along the bottom for the bulk feed to fall out of the vein compartments and into the trough. Bearings allowing the shaft to spin inside the rotary vein tube are positioned on each end of the feeder (shown as bearings 18 in FIG. 2).

Figure 9:
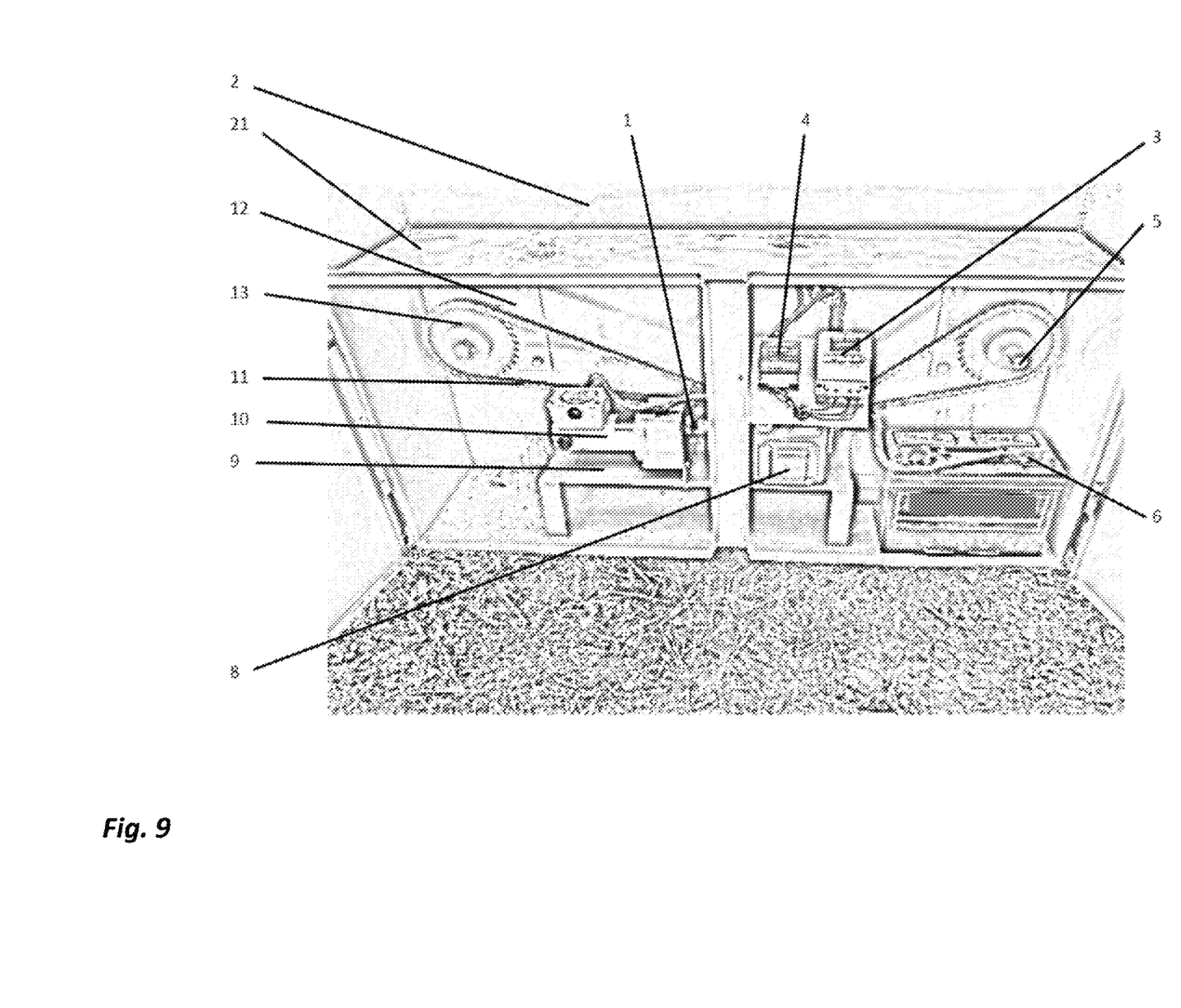
FIGS. 9 and 10 are diagrams depicting a motor assembly embodiment in accordance with the disclosed subject matter.

As shown in FIG. 9, the rotary vein tubes are oriented such that they attach directly below funnel 35 and above feed trough 27. Rotary vein caps 12 are removable panels on front end wall 2 that allow rotary vein tube assembly 36 to be installed into and removed from rotary vein tube 16. Lubrication means, such as, grease zerks or other lubrication fittings, shown as fittings 38 are located on both ends where shafts 5 goes into bearings 18.

While the rotary vein tube is rigidly attached to the end walls common to the storage compartment, the shaft and attached wipers (and thus the resulting vein compartments formed as the space between adjacent wipers) rotate inside the rotary vein tube. According to the disclosed embodiments represented in the figures, this design has eight vein compartments; however, any number of vein compartments of various sizes may be used depending on the amount of feed to be dispensed.

Figure 6:
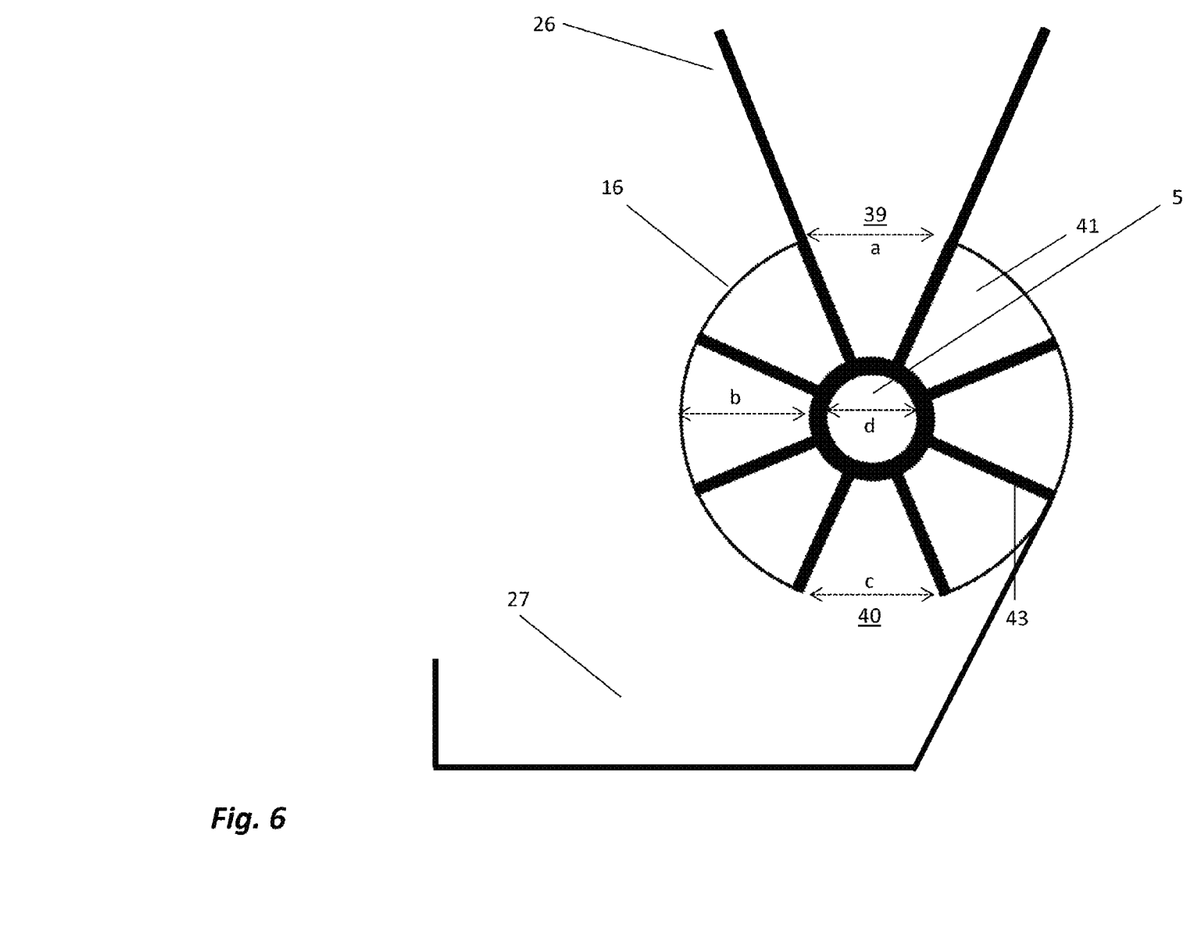
FIG. 6 is a diagram of a cross-section of a rotary vein assembly embodiment in accordance with the disclosed subject matter.

FIG. 6 is a diagram of a cross-section of a rotary vein assembly embodiment in accordance with the disclosed subject matter. The vein assembly is designed to be positioned between feed bin 26 and trough 27. The rotary vein assembly comprises rotary vein tube 16 and houses rotatable vein shaft 5. Positioned in a spoke arrangement around shaft 5 are flexible wipers 43 that form vein compartments that run the horizontal length of rotary vein tube 16, shown as vein compartments 41. Rotary vein tube inlet 39 is an opening that runs substantially the length of rotary vein tube 16, and allows feed to fall from feed bin 26 into rotary vein compartments formed in-between the flexible wipers. Rotary vein tube outlet 40 is an opening that runs substantially the length of rotary vein tube 16 and allows feed to fall from the rotary vein compartments into trough 27.

Note that the rotary vein tube inlet and rotary vein tube outlet are approximately the same size as the vein compartment openings—this is to help ensure that the vein compartments are efficiently filled with feed from the feed bin and efficiently dispense feed into the trough. However, alternative vein compartment sizes may also be utilized, such as vein compartments with opening widths one half of the rotary vein tube inlet, in order to manage the amount of feed intake and outtake. Additionally, the vein tube inlet and vein tube outlet may be different sizes. Minimal vein tube sections may be left in place throughout the length of the tube to maintain the structural integrity of the rotary vein tube. Specifically, sections creating the rotary vein tube inlet and rotary vein tube outlet are not removed from the rotary vein tube at either end of the tube, and various small sections may also be left in place at various intervals to maintain the structural integrity of the tube. (These sections may be seen in FIG. 8.)

Shaft 5 acts as a hub for flexible wipers 43, attached as spokes to shaft 5, to rotate within rotary vein tube 16 and transport feed from feed bin 26 to trough 27 in the open compartment between each flexible wiper. The vein assembly may rotate clockwise or counter-clockwise depending on the trough and feeder bin arrangement. Further, as an example, a rotary vein assembly may have the following dimensions as indicated in FIG. 6: a=4", b=3.25", c=4", and d=1.5".

In this embodiment, shaft 5 and the flexible wipers are shown rigidly affixed, and thus may be considered one workpiece. The wipers may be attached to the shaft by welding or other suitable attachment means to create multiple individual veins or feed compartments, such as vein compartment 41, inside each rotary vein tube.

Figure 7A:
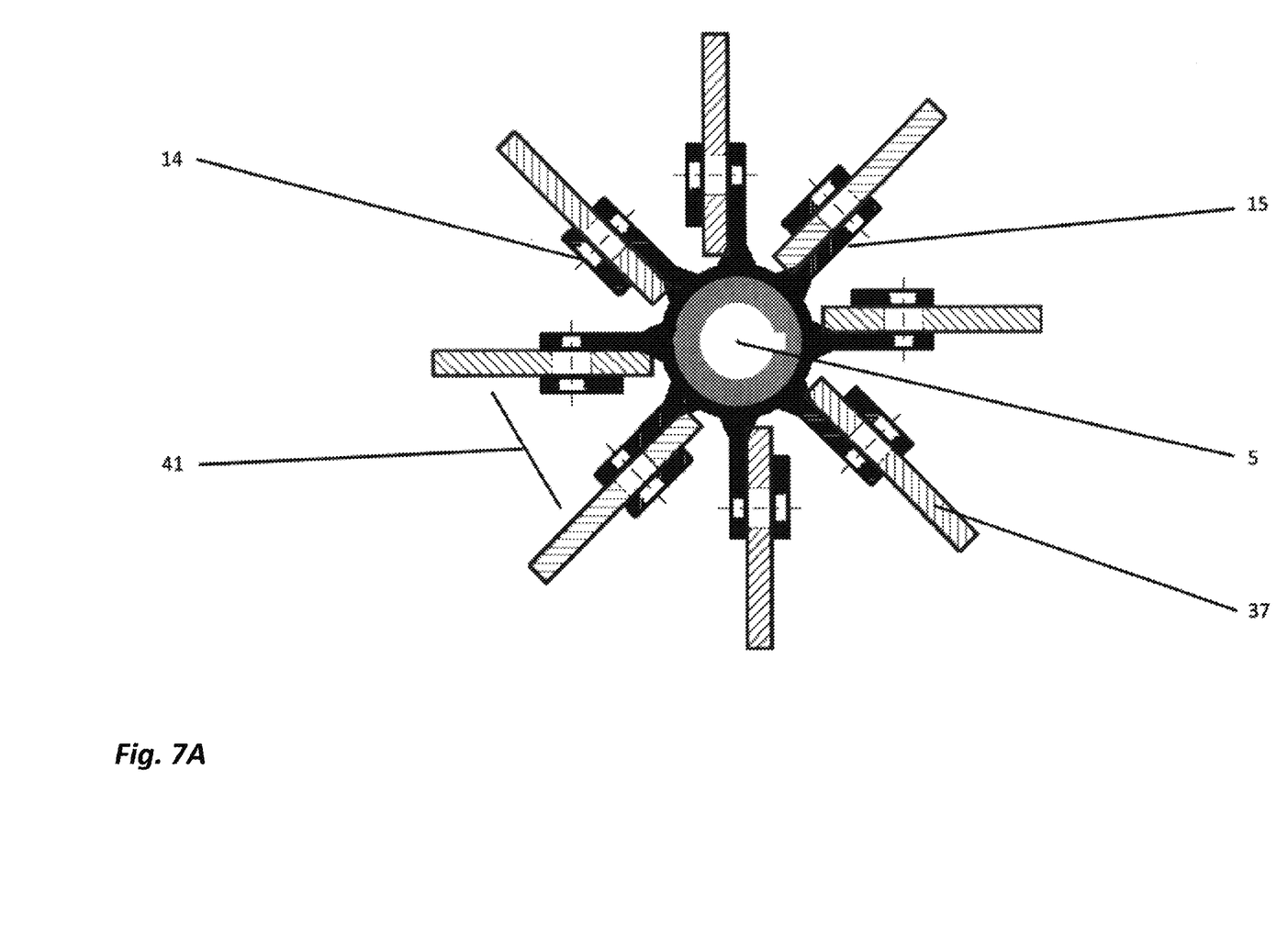
FIGS. 7A through 7C are diagrams showing various views of a rotary vein assembly embodiment with a paddle assembly in accordance with the disclosed subject matter.

FIG. 7A is a diagram of a cross-section of an alternative embodiment of a rotary vein shaft, termed a feed paddle assembly herein, in accordance with the disclosed subject matter. In this embodiment, flexible wipers 37 are affixed to rigid wipers 15 by securing a flat rigid banding material, referred to as wiper plates 14, to rigid wipers 15 with flexible wipers 37 positioned and secured in-between. This attachment may be via a plurality of attaching means such as screws, nuts, washers, and bolts. A gap or spacing is designed between the inside diameter of the rotary vein tube and the rigid wiper to accommodate various sizes and types of feed material. This gap is bridged by the flexible strip of which may be made of rubber or any flexible material suitable for flexibility while remaining structurally rigid enough to trap bulk feed in the vein compartments, shown as flexible wipers 37. This embodiment allows for the easy replacement of flexible wipers 37. Further, wiper plate 14 provides structural support to flexible wiper 37 as it rotates inside the vein tube. Shown, rigid wiper 15 and flexible wiper 37 attached at a 90 degree angle to shaft 5, although other angles may be utilized in order to manage in intake and outtake of feed into the vein compartments.

The vein assembly disclosed allows for common feed of various sizes to be used. For example, in the embodiment shown in FIG. 7, each flexible wiper 37 attached to the rigid wiper 15 flex to allow for different sizes of material that may bind in the gap when the shaft 5 rotates—thus allowing the rotary vein mechanism to accommodate various sizes of bulk materials. As a result of this flexible assembly, cubes from 5/32 inch to 3/4 inch will not lodge and may be used (as well as pellets, powdered, or textured feed).

Figure 7B:
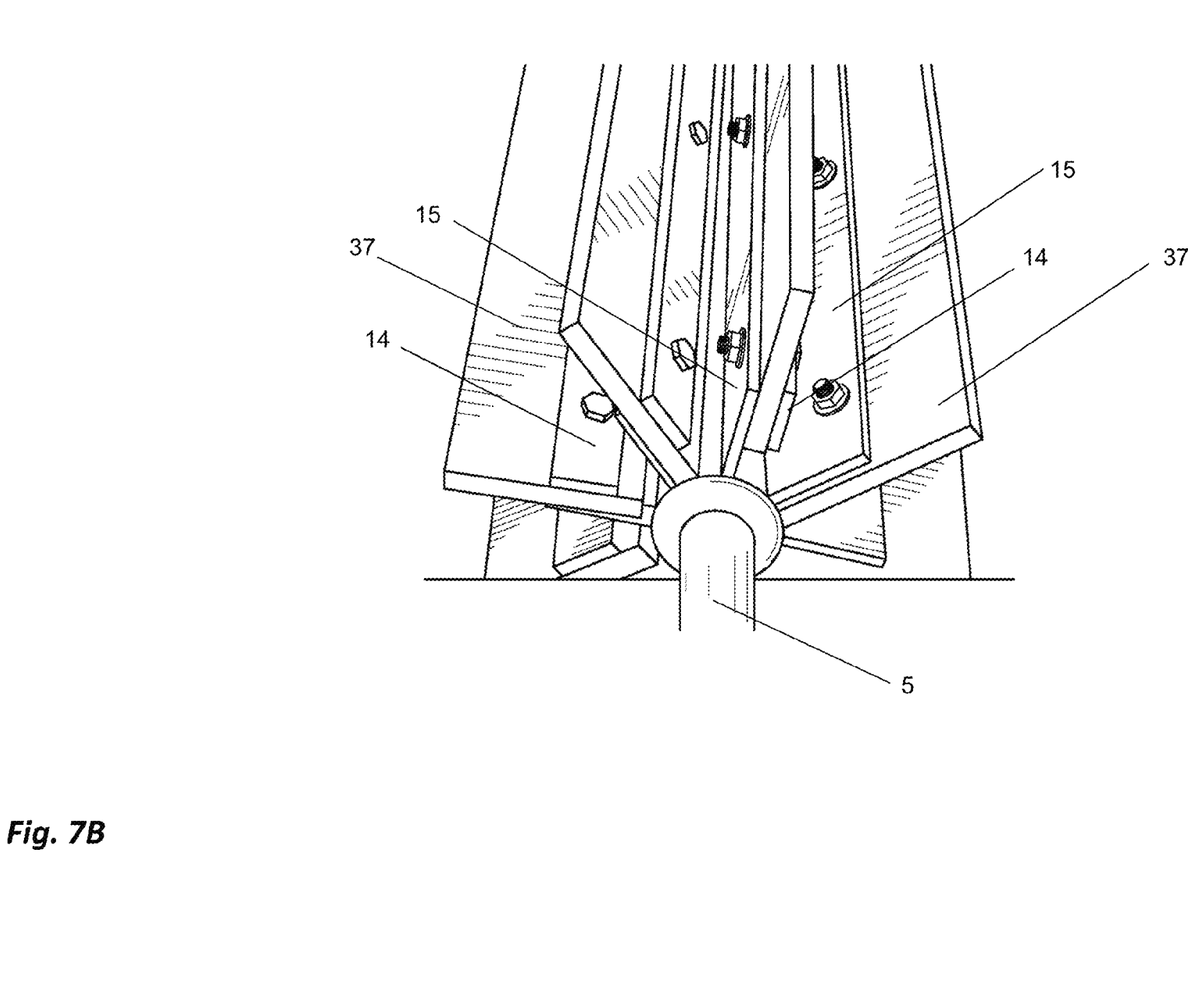
Figure 7C:
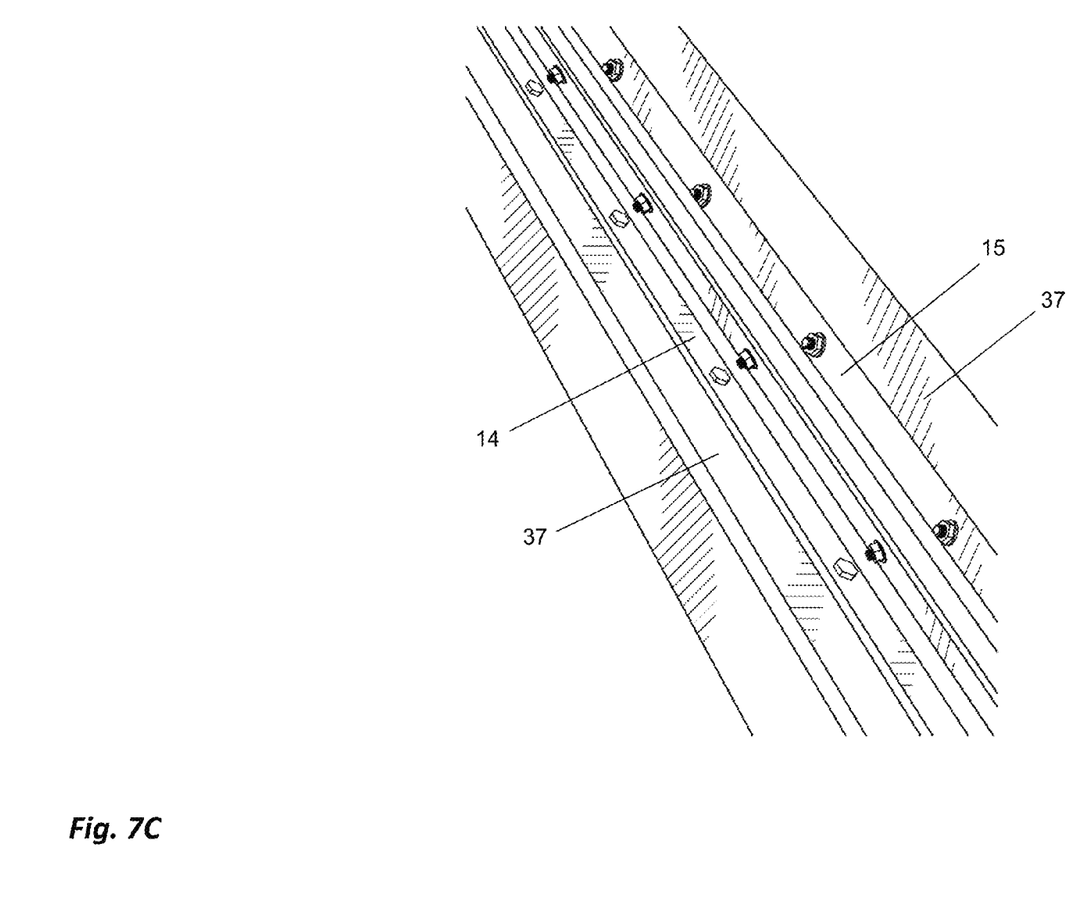

FIGS. 7B and 7C are diagrams of the vein rotary shaft of FIG. 7A from alternate viewpoints. Each flexible wiper 37 runs the length of the vein shaft and rotates inside a rotary vein tube to transfer feed from a feed storage bin above into a trough below.

Figure 8:
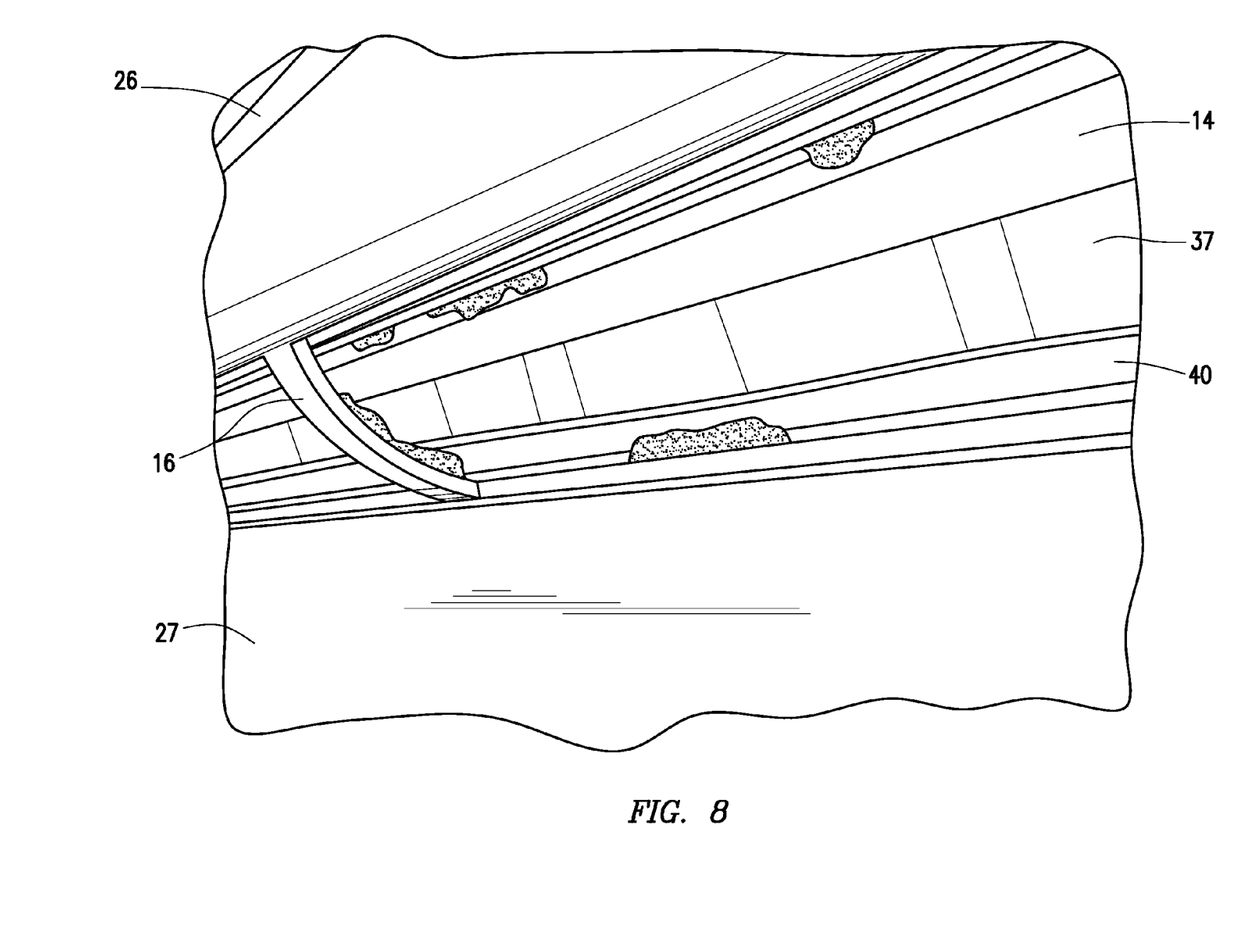
FIG. 8 is a photograph showing a rotary vein assembly positioned between a feed bin and a trough.

FIG. 8 is a photograph of an embodiment of the rotary vein assembly depicted in FIG. 7. As shown, the rotary vein assembly is positioned between the feed bin 26 and trough 27. Vein tube 16 houses the rotating shaft (not shown) with attached flexible wiper 37 and wiper plate 14. As the vein assembly rotates, feed falls from the feed bin into the vein compartments and falls out of the vein assembly, at rotary vein outlet 40, into the trough for consumption. As shown, portions of rotary vein tube 16 are left in place to maintain structural integrity.

Figure 10:
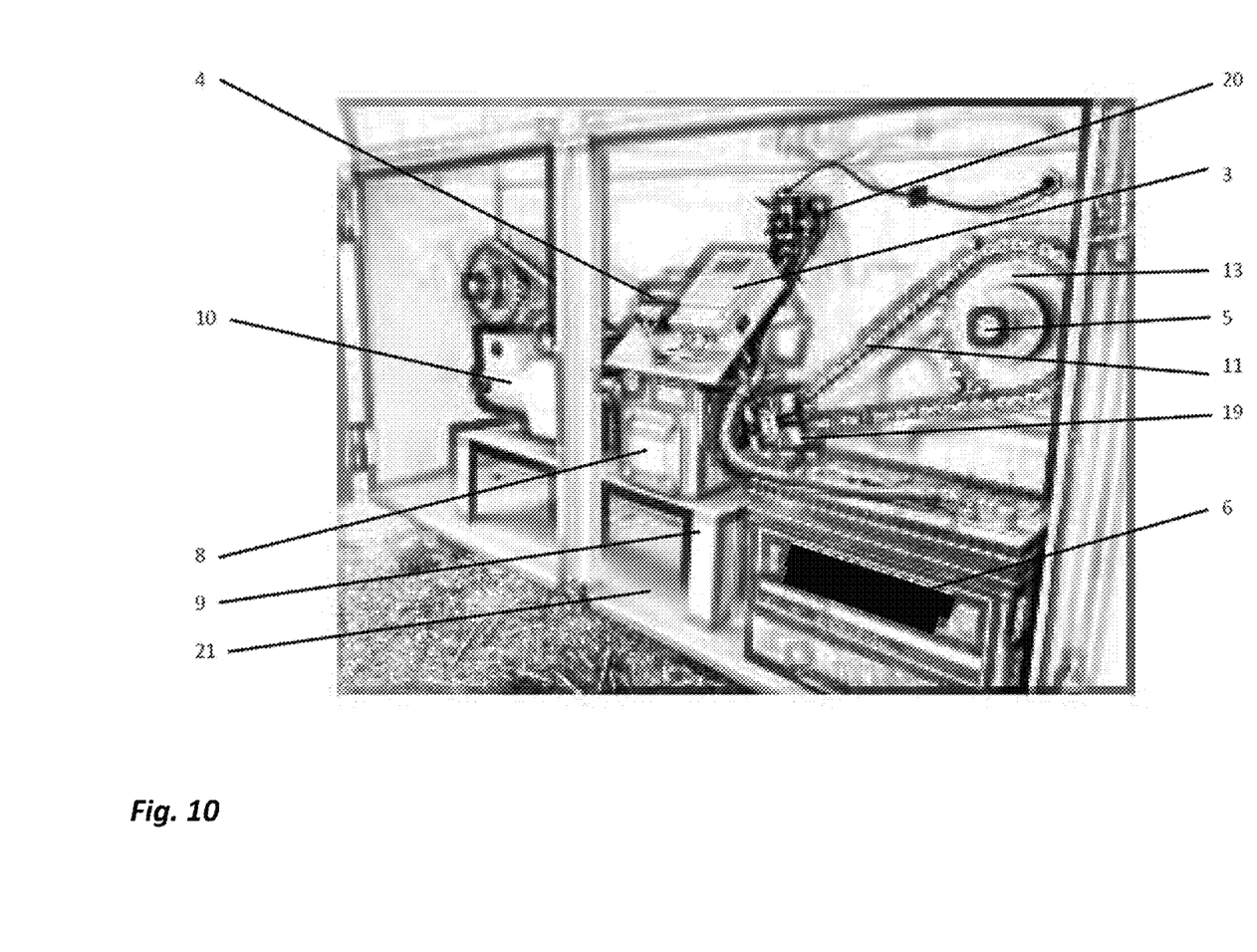

FIGS. 9 and 10 are diagrams depicting an embodiment of a motor component used to automatically rotate the shaft of the vein assembly. The motor component is positioned at one end of the feeder in a weatherproof enclosure shown as motor box 21. Motor box 21 attaches to the front end wall, shown as front end wall 2, of the feeder, and access doors facing outwards provide access to the motor housed inside. One end of each vein shaft, depicted herein as shaft 5, extends beyond the bearings securing the shaft and protrudes into motor box 21 (the side opposite bearings 18 shown in FIG. 2). This end of the shaft is connected to a common rotary transmission means that makes the rotary vein mechanism operate. Such rotary transmission may be sprockets, chains, idlers, gear drives, or any other transmission means operatively connected to rotational forces supplied by electric motors, gasoline, diesel, or propane engines, or any other rotational means known in the art of rotational motion. Motor box 21 is of a size large enough to house the transmission means utilized.

Motor 10 is mounted on motor plate 9 inside motor box 21. Motor 10 is connected to gear box 8 also mounted on motor plate 9 by attachment means such as welding or screws, nuts, bolts, and washers or the like. Motor 10 and gear box 8 are connected by shaft coupler 1, or by any other suitable connection means. In this embodiment, the power requirement for the rotary transmission is a motor, shown as motor 10, of electric rotational means that is powered by a battery, shown as battery 6, and also coupled with a solar panel charging system. However, a direct current (DC) motor may also be utilized.

Battery 6 may be of any type known to those skilled in the art and optionally may be charged by solar panel 22 mounted on the top cover. Solar panel 22 may be a known solar panel assembly. Electrical conduit or other suitable enclosure runs from motor box 21, through storage compartment 26, and connects to top cover 42. This enclosure protects the wiring that connects battery 6 with solar panel 22 to maintain battery charge for operating the motor 10.

Charge controller 4 keeps solar panel 22 from damaging battery 6 by interrupting the charge when the battery 6 reaches full capacity. Also, a solenoid, shown as solenoid 20, may be utilized to reduce the electric current timer 3 receives from the battery—thus protecting timer 3. Both charge controller 4 and solenoid 20 are housed in motor box 21 and are protected from the elements.

Inside motor box 21, hub sprocket 13 attaches to the end of shaft 5 with known attachment means familiar to those in the field. Shown, the gears or cogs of hub sprockets 13 are connected via chains 11 with chain tensioner 19 to another set of sprockets 7 attached to gear box 8. As a result, rotary transmission is achieved by connecting motor 10 to the shafts inside the motor box.

Optionally, as shown in FIGS. 9 and 10, electronic timer 3 may be mounted in the motor box to start and stop the feeding mechanism automatically. Conventional and commercially available timers, as well as relays, microprocessors, computers, timer mechanisms, programmable logic controllers, or any electronic device known in the art of electronic control devices may be used. Additionally, timer 3 is optionally connected to an audible alarm for audibly alert the livestock when the feeding mechanism begins to dispense feed.

Additionally, a gear reduction type of gear box may be utilized to allow for more flexibility in adjusting the amount of material dispensed—by slowing down the shaft rotation. Using a gear reducer, the rotation inside the rotary vein tube is slower than the motor allowing for more adjustment of the dispensing amount. Without gear reduction, the amount of feed dispensed may be limited (assuming fixed vein compartment size) because the shaft would rotate more times at the minimal timer setting. Slowing the shaft rotations down and running the motor longer allows for increased flexibility concerning the total amount of feed dispensed. Further, a gear reduced motor works more efficiently and consumes less energy thus saving battery power.

In addition to the time the shaft rotates during one feeding, variations in the size of the vein compartment, the amount of vein compartments, the size of the top and bottom vein tube openings, and the shaft rotation speed may all be customized to manage the amount of feed dispensed into the trough. Thus, the disclosed feeder may be used to dispense any amount of feed to accommodate a wide range and number of livestock.

In operation, the disclosed feeder provides reliable automatic feeding for large breed livestock. To load the feed bin with feed, a person climbs ladder 17 and loads bulk materials into feed bin 26 via lid doors 23 on top of the feeder. After filling feed bin 26, a feeding schedule may be selected by means of the programmable timer 3. Timer 3 controls operation of motor 10 that drives the gravity fed rotary-vein mechanism and is programmable to dispense feed at various times of day. The length of time that motor 10 rotates shaft 5 helps to determine the amount of feed to be dispensed for consumption. Therefore, the amount of feed dispensed is also controlled by timer 3 by selecting the length of time motor 10 is actuated (ranging from one second on).

When the selected feeding times are reached, timer 3 sends an electrical impulse or signal to motor 10, causing it to operate for the designated length of time. Motor 10, gearbox 8, chains 11, and sprockets 13 and 7 operate to rotate shaft 5 inside rotary vein tube 16. In other words, when the selected feeding times are reached the motor rotates the shaft with the rotary vein tube and feed is transported from the feed bin to the trough via the vein compartments. Gravitational forces send bulk feed material in feed bin 26 into funnel portion 35. From funnel portion 35 the feed material goes into rotary vein tube 16 by way of the rotary vein tube inlet 39. As shaft 5 rotates, bulk feed from the storage compartment above, feed bin 26, fills vein compartments 41 due to gravitational forces. Importantly, only the empty vein directly under rotary vein tube inlet 39 fills with the bulk feed material. As shaft 5 continues to rotate, additional vein compartments continue to come under rotary vein tube inlet 39 and fill with feed.

As shaft 5 continues rotating, the vein compartments full of feed material rotate and discharge the feed material through the bottom vein opening, shown herein as rotary vein tube outlet 40. The feed material falls from the rotary vein tube outlet into attached receptacles or feed troughs below. As a result of continued rotary transmission, bulk feed material continues to flow from the bulk feed storage compartment (feed bin 26) into the recently discharged vein compartments in the rotary vein tube via the rotary vein tube inlet 39. This feed dispensing process will continue to dispense bulk feed material as long as the motor is actuated. In the depicted embodiment, the feed is distributed into two feed troughs located on opposite sides of the feeder, each with a corresponding funnel component and vein assembly, facilitating the feeding of multiple animals on both sides of the feeder.

In operation, the disclosed feeder provides a reliable, economically advantageous, and sturdy device suited for long-term livestock feeding operations. The sturdy and rugged structure for storing and distributing feed to large, active animals may replace the need for expensive labor while automatically and reliably dispensing bulk feed on a predetermined schedule that is the most advantageous for livestock. Further, the feeder is capable of feeding multiple times a day for long periods without a need to reload the feed bin because of the large feed bin size.

Other applications of the disclosed feeder include dispensing road construction material by adapting the size and orientation of the structure to a trailer to distribute road-base construction material at an effective rate needed at a specific rate of travel. Thus, the amount of road-base construction material dispensed would be consistent despite an operator pulling the feeder at various speeds. Another application is in commercial bakeries or breweries for the large scale dispensing of multiple ingredients at a needed rate. Multiple feeders may be dedicated to specific ingredients mounted over a common collection area with the units dispersion rates coordinated as needed. A simple embodiment of the same design, but of a tailored size, could foreseeably meet the needs of containing ocean oil spills whereby barges may mount the disclosed feeder to reliably dispense oil contamination and containment agents at needed amounts and intervals. In yet another application, many appliances for both heating and cooking with wood utilize wood pellets as a fuel source, such as a wood-burning furnace or pellet-fired smoker. The disclosed feeder may automatically dispense wood pellets to the appliance to keep the heat source or amount of smoke consistent for best results.

The foregoing description of the exemplary embodiments is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

It is intended that all such additional systems, methods, features, and advantages that are included within this description be within the scope of the claims.

What is claimed is:

1. An automatic feeder for dispensing bulk feed to livestock, comprising:

a feed bin for storing bulk feed material, said feed bin comprising a lower funnel portion;

a vein assembly for transferring said bulk feed material from said feed bin to a trough, said vein assembly horizontally positioned below said feed bin at said lower funnel portion and above said trough, said vein assembly comprising:

a rotary vein tube, said rotary vein tube housing a rotatable vein shaft which rotates inside said rotary vein tube, said rotary vein tube comprising a rotary vein tube inlet opening allowing feed to fall from said feed bin into said vein tube and a rotary vein tube outlet allowing feed to fall from said rotary vein tube into said trough, wherein at least a portion of said rotary vein tube outlet is in vertical alignment with at least a portion of said rotary vein tube inlet; and said rotatable vein shaft, comprising a shaft and a plurality of flexible wipers separately affixed as spokes to said shaft, wherein vein compartments for transferring feed are formed between said flexible wipers;

said trough positioned below said vein assembly and attached to said rotary vein tube, said trough having a trough cover covering a feeding portion of said trough;

a motor assembly comprising a rotary transmission means for turning said shaft and a power source for powering said rotary transmission means;

a timer programmable to actuate said motor assembly at a predetermined time for a predetermined period; and supports attached to the bottom of said automatic feeder and supporting said feeder off of the ground.

2. The automatic feeder of claim 1, wherein said flexible wipers are permanently affixed to said shaft to form one workpiece.

3. The automatic feeder of claim 1, wherein said flexible wipers are attached to said shaft according to a paddle assembly.

4. The automatic feeder of claim 1, wherein said motor assembly further comprises a gear reducer.

5. The automatic feeder of claim 1, wherein the width of said rotary vein tube inlet opening, said rotary vein tube outlet opening, and the openings of said vein compartments are equivalent.

6. The automatic feeder of claim 1, wherein said power source further comprises a solar panel positioned on top of said automatic feeder.

7. A dual trough automatic feeder for dispensing bulk feed to livestock, comprising:

a feed bin for storing bulk feed material, said feed bin comprising two lower funnel portions;

two vein assemblies for transferring said bulk feed material from said feed bin to two corresponding troughs, each of said troughs positioned on separate sides of said automatic feeder, each of said vein assemblies horizontally positioned below said feed bin at a corresponding lower funnel portion and above said corresponding trough, each of said vein assembly comprising:

a rotary vein tube, said rotary vein tube housing a rotatable vein shaft which rotates inside said rotary vein tube, said rotary vein tube comprising a rotary vein tube inlet opening allowing feed to fall from said feed bin into said vein tube and a rotary vein tube outlet allowing feed to fall from said rotary vein tube into said trough; and said rotatable vein shaft comprising a shaft and a plurality of flexible wipers affixed as spokes to said shaft, wherein vein compartments for transferring feed are formed between said flexible wipers;

each of said troughs positioned below said corresponding vein assembly and attached to said rotary vein tube of said corresponding vein assembly, each of said troughs having a trough cover covering a feeding portion of said trough;

a motor assembly comprising a rotary transmission means for turning said shaft and a power source for powering said rotary transmission means;

a timer programmable to actuate said motor assembly at a predetermined time for a predetermined period; and supports attached to the bottom of said automatic feeder and supporting said feeder off of the ground.

8. The automatic feeder of claim 7, wherein said flexible wipers are permanently affixed to said shaft to form one workpiece.

9. The automatic feeder of claim 7, wherein said flexible wipers are attached to said shaft according to a paddle assembly.

10. The automatic feeder of claim 7, wherein said motor assembly further comprises a gear reducer.

11. The automatic feeder of claim 7, wherein the width of said rotary vein tube inlet opening, said rotary vein tube outlet opening, and the openings of said vein compartments are equivalent.

12. The automatic feeder of claim 7, wherein said power source further comprises a solar panel positioned on top of said automatic feeder.

* * * * *